(12) United States Patent
Piani (10) Patent No.: US 12,358,737 B2
(45) Date of Patent: Jul. 15, 2025

(54) DEVICE FOR REPLACING A PALLET CARRYING A LOAD WITH A REPLACEMENT PALLET

(71) Applicant: TOPPY S.R.L., Valsamoggia (IT)

(72) Inventor: Daniele Piani, Monte San Pietro (IT)

(73) Assignee: TOPPY S.R.L., Valsamoggia (IT)

( * ) Notice: Subject to any disclaimer, the term of this patent is extended or adjusted under 35 U.S.C. 154(b) by 0 days.

(21) Appl. No.: 18/432,176

(22) Filed: Feb. 5, 2024

(65) Prior Publication Data
US 2024/0262639 A1    Aug. 8, 2024

(30) Foreign Application Priority Data

Feb. 6, 2023    (IT) .................. 102023000001911

(51) Int. Cl.
*B65G 60/00*    (2006.01)
(52) U.S. Cl.
CPC ...... *B65G 60/00* (2013.01); *B65G 2201/0267* (2013.01); *Y10S 414/106* (2013.01); *Y10S 414/108* (2013.01)
(58) Field of Classification Search
CPC .. B65G 1/00; B65G 2201/0267; B65G 57/00; B65G 59/00; B65G 59/063; Y10S 414/106; Y10S 414/108; Y10S 414/107; Y10S 425/118; B65D 2519/00776
See application file for complete search history.

(56) References Cited

U.S. PATENT DOCUMENTS 3,123,232 A  *  3/1964  Postlewaite .............. B65G 1/00
                                            414/416.05
3,499,560 A     3/1970  Le Gros
(Continued)

FOREIGN PATENT DOCUMENTS

DE    20 2004 006900 U1    11/2004
EP          1 369 361 A1    12/2003
(Continued)

OTHER PUBLICATIONS

Italian Search Report and Written Opinion for application No. IT2023000001911 completed Aug. 2, 2023, 7 pages.
(Continued)

*Primary Examiner* — Gregory W Adams
(74) *Attorney, Agent, or Firm* — Francis J. Maguire; WARE FRESSOLA MAGUIRE & BARBER LLP (57) ABSTRACT

A device for replacing a pallet carrying a load includes first and second store elements (3, 7); an entrance element (11) between the first and second store elements; and a translating element (17) provided with a first seating (19) in the first store element and a second seating (21) in the entrance element for respectively receiving a replacement pallet and an original pallet wherein such translating element (17) is moved parallelly to itself between a first extreme condition (I) in which the first seating (19) and the second seating (21) are respectively placed in correspondence with the base (5) of the first store element (3) and with the base (6) of the entrance element (11) and a second extreme condition (F) in which the first (19) and second (21) seatings are respectively placed over the bases (6, 9) of the entrance element (11) and the second store element (7).

6 Claims, 11 Drawing Sheets

(56) References Cited

U.S. PATENT DOCUMENTS

| | | | | |
|---|---|---|---|---|
| 4,753,564 A * | 6/1988 | Pearce | .................. | B65G 59/04 |
| | | | | 414/789.5 |
| 5,645,392 A * | 7/1997 | Leichty | ................ | B65G 59/063 |
| | | | | 414/416.01 |
| 2021/0188572 A1 * | 6/2021 | Heide | .................. | B65G 1/0485 |
| 2022/0073291 A1 * | 3/2022 | Piani | ...................... | B65G 61/00 |

FOREIGN PATENT DOCUMENTS

| | | | | |
|---|---|---|---|---|
| FR | 2499955 A1 * | 8/1982 | ............. | B65G 57/00 |
| WO | 2020/182888 A1 | 9/2020 | | |
| WO | WO-2021027418 A1 * | 2/2021 | ........... | B65G 59/063 |

OTHER PUBLICATIONS

Bibliographic Data including English Abstract for German Patent Application Publication DE202004006900U1, 3 pages.

* cited by examiner

FIG.20

DEVICE FOR REPLACING A PALLET CARRYING A LOAD WITH A REPLACEMENT PALLET

BACKGROUND OF THE INVENTION

The present invention relates to the sector concerning the packaging, handling, transport and storage of goods and refers to a device for replacing a pallet that supports a load with a replacement pallet. In particular, the invention provides for the possibility of replacing a pallet supporting boxed or otherwise packaged goods with another different pallet even in the case of goods or packages that are delicate or fragile or cannot be tilted or tipped.

There are known devices which move the pallet vertically with respect to the corresponding load or vice versa and then remove such pallet and place a new pallet under the load. These devices have the disadvantage of necessarily having to grip the load, subjecting it to lateral pressure and therefore not being able to operate with fragile or delicate goods or packaging.

There are also known devices which rotate by approximately 180°, i.e. which overturn the pallet with the respective load so that the pallet, being thus placed above the load, is easily removed and replaced with a different one, the subsequent opposite rotation brings the new pallet below the load it can thus support. Such second type of device has the disadvantage of not being able to be used with products, for example toner, certain equipment and some products containing liquids, which cannot be overturned.

Further disadvantages of both types of known devices indicated above consist in the fact that they are generally expensive, complex to maintain, bulky and sometimes slow.

BRIEF SUMMARY OF THE INVENTION

An object of the present invention is to propose a device for replacing a pallet that supports a load with a replacement pallet that can operate with products and packages that are even fragile and delicate and/or that cannot be tilted.

Another object is to propose a device whose purchase and maintenance are relatively cheap.

A further object is to propose a relatively simple, reliable and easy-to-use device.

Another object is to propose a device which, having few and protected moving parts, is safe for goods and above all for bystanders.

A further object is to propose a compact and lightweight device.

Another object is to propose a device that allows operation with one or more modes.

According to the present invention, a device for replacing a pallet carrying a load includes
   first and second store elements;
   an entrance element between the first and second store elements;
   a translating element provided with a first seating in the first store element and a second seating in the entrance element for respectively receiving a replacement pallet and an original pallet wherein such translating element is moved parallelly to itself between a first extreme condition in which the first seating and the second seating are respectively placed in correspondence with the base of the first store element and the base of the entrance element and a second extreme condition in which the first and second seatings are respectively placed over the bases of the entrance element and the second store element.

BRIEF DESCRIPTION OF THE SEVERAL VIEWS OF THE DRAWING

The characteristics of the invention are highlighted below with particular reference to the attached drawings in which.

DETAILED DESCRIPTION OF THE INVENTION

With reference to FIGS. 1-18, numeral 1 indicates the device for replacing an original pallet O which supports a load C with a replacement pallet S, object of the present invention, comprising at least:
   a first store element 3 assigned to receive a stack of replacement pallets S and to deposit them one by one at its base 5 that is to deposit them in the respective lower space or volume;
   a second store element 7 assigned to receive at its base 9, or in the respective lower space or volume, one original pallet O at a time and to form a stack of such overlapping original pallets O;
   an entrance element 11 interposed between the first 3 and second 7 store elements assigned to receive an original pallet O with the respective load C; such entrance element 11 is separated from the second store element 7 by a stopping wall 13, with an almost flat and vertical face facing the load C which it is assigned to meet; the stopping wall 13 has at its base, that is under its lower end, a window element 15 assigned for the passage of only the original pallet O;
   a translating element 17, of approximately flat shape, provided with a first seating 19 and a second seating 21 assigned to respectively receive a replacement pallet S and an original pallet O where such translating element 17 is moved parallel to itself between a first extreme condition I in which the first seating 19 is placed in correspondence with the base 5 of the first store element 3 and the second seating 21 is placed in correspondence with the lower portion or base 6 of the entrance element 11 and a second extreme condition F in in which the first seating 19 is placed in correspondence with said lower portion or base 6 of the entrance element 11 and the second seating 21 is placed in correspondence with the base 9 and the second store element 7.

Figure 1:
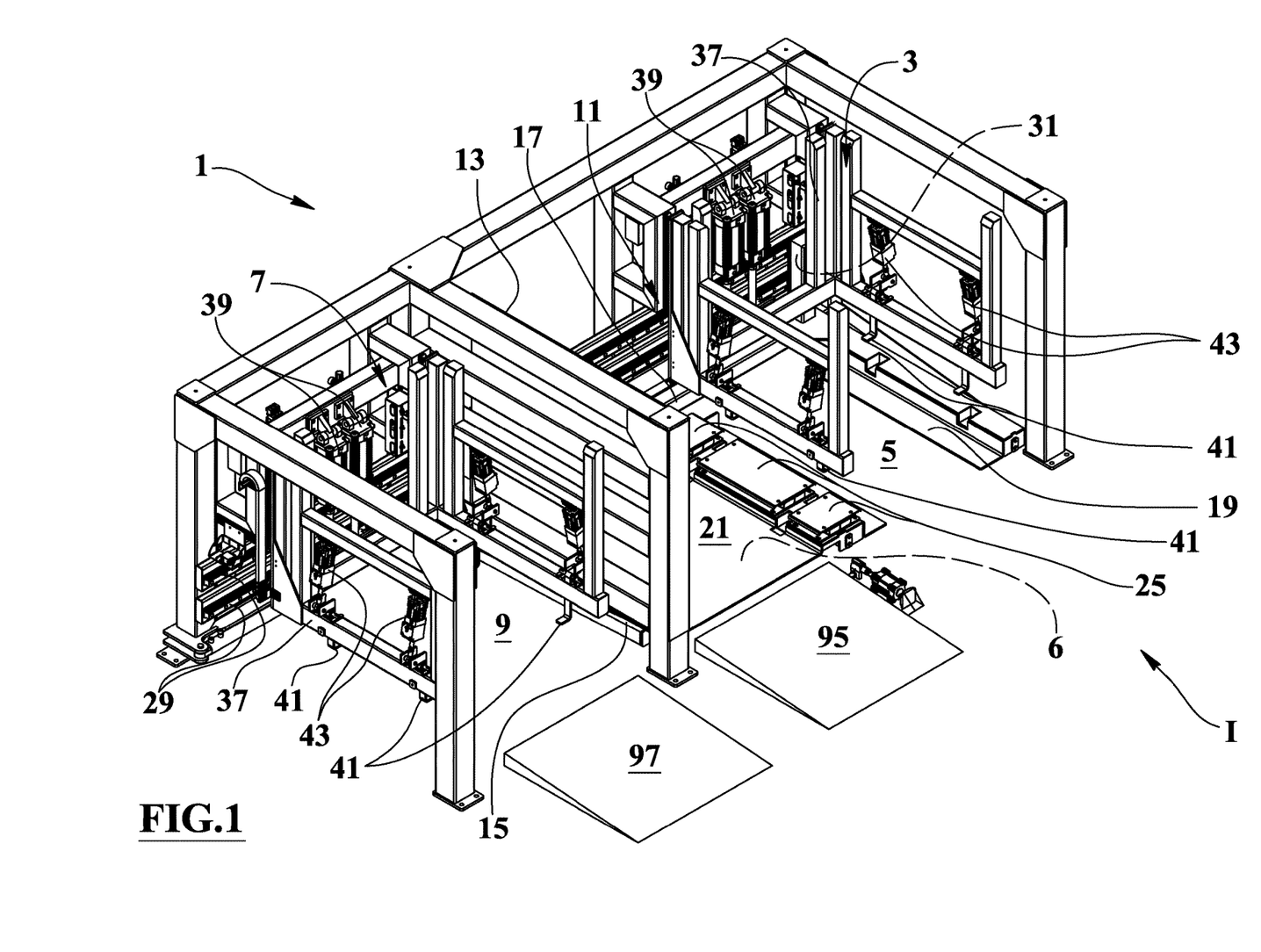
FIG. 1 illustrates an axonometric and schematic view of the device for replacing a pallet that supports a load with a replacement pallet, object of the present invention.
Figures 2, 3:
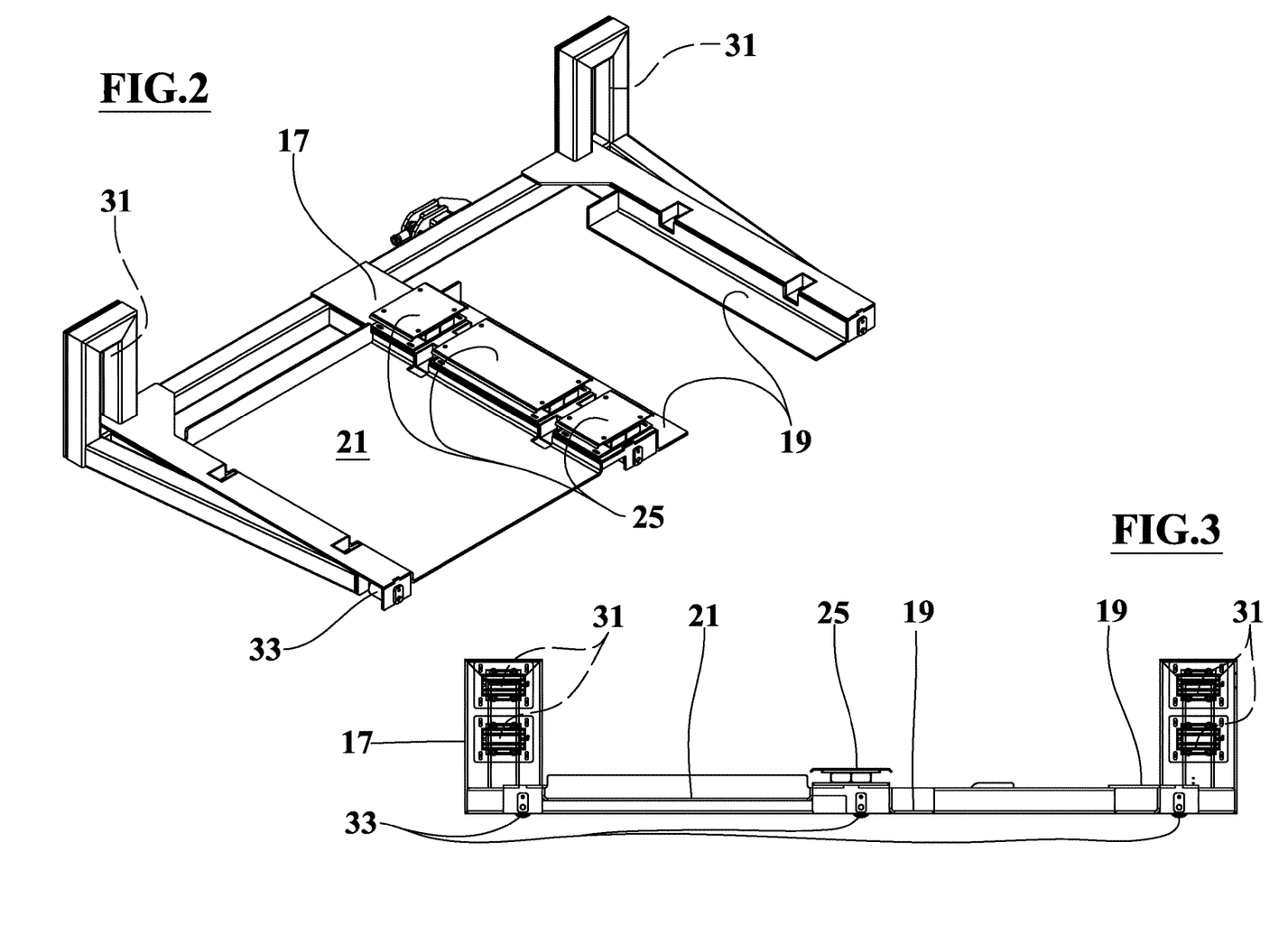
FIG. 2 and FIG. 3 illustrate axonometric and frontal views respectively, with some parts shown in transparency of a detail of FIG. 1.
Figure 4:
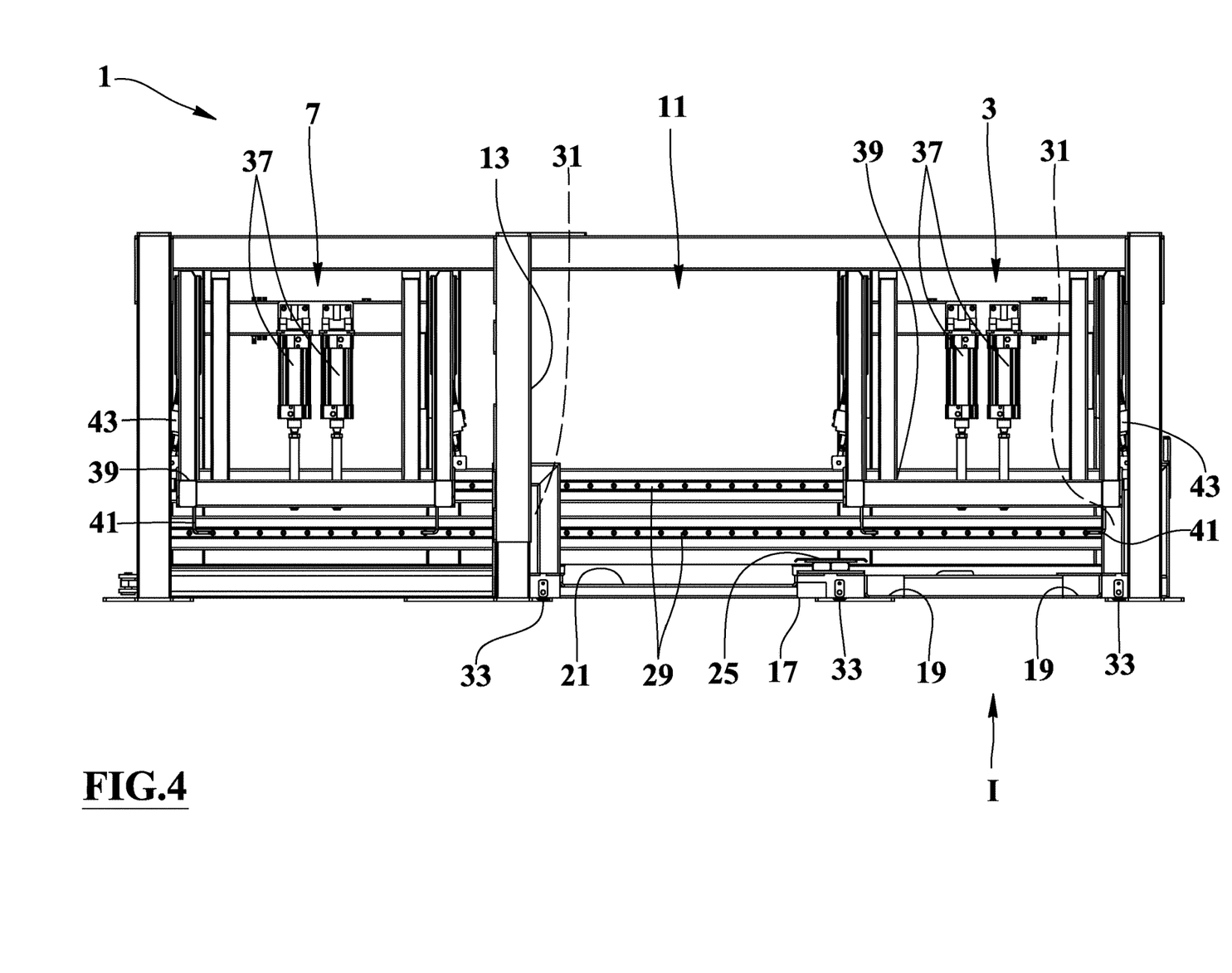
FIG. 4 and FIG. 5 illustrate front views of the device of FIG. 1 in which the detail of FIGS. 2 and 3 is in respective extreme conditions.
Figure 5:
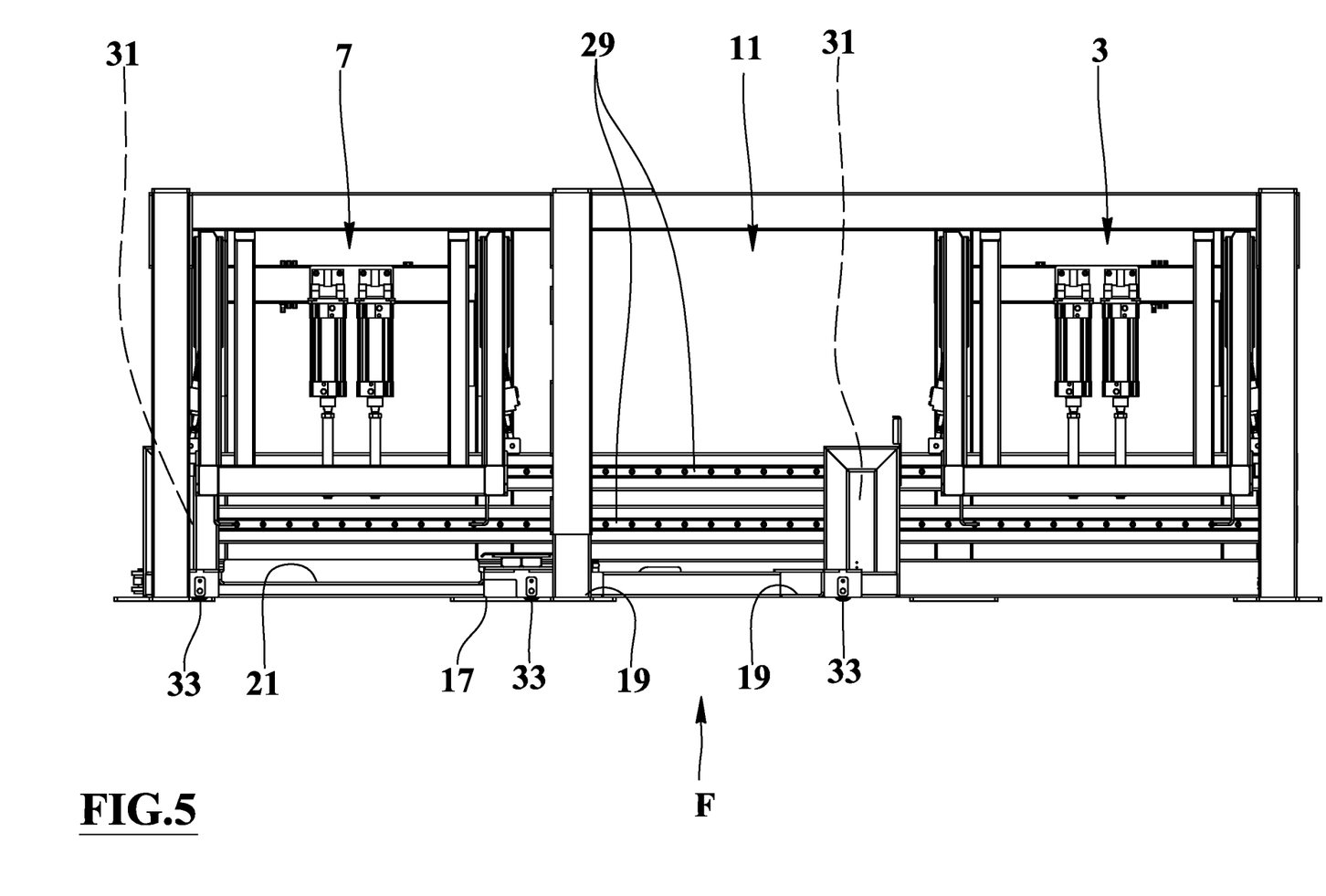
Figure 6:
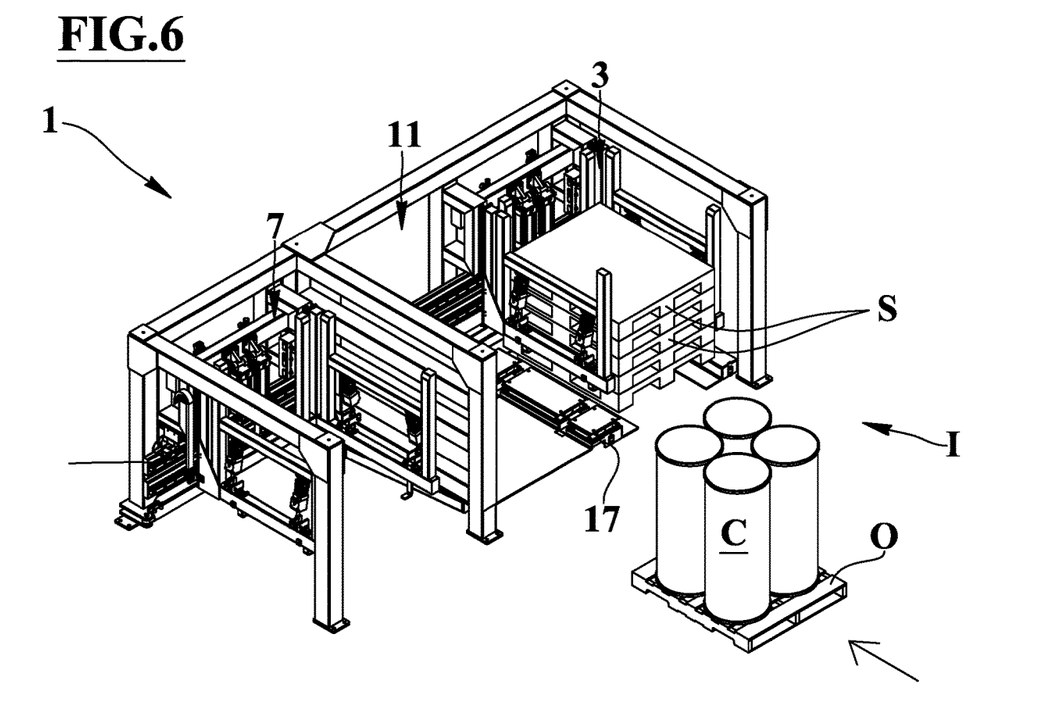
FIGS. 6-9 illustrate axonometric views of the device of FIG. 1, associated with a load supported by a pallet that needs to be replaced and a set of replacement pallets, which schematize a possible pallet replacement sequence.
Figure 7:
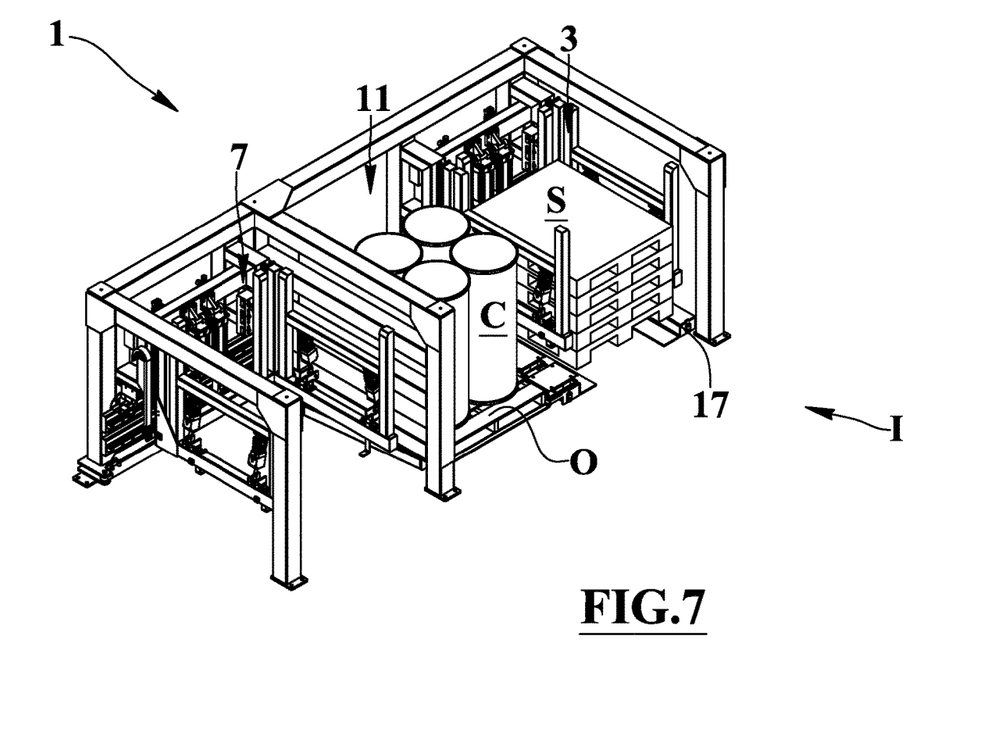
Figure 8:
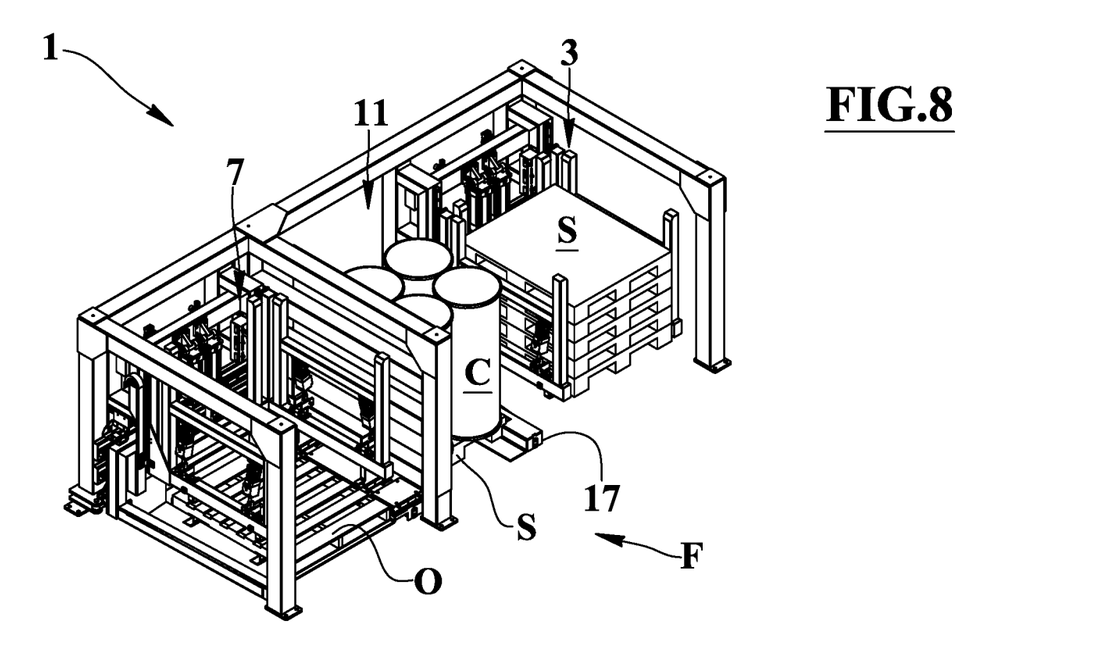
Figure 9:
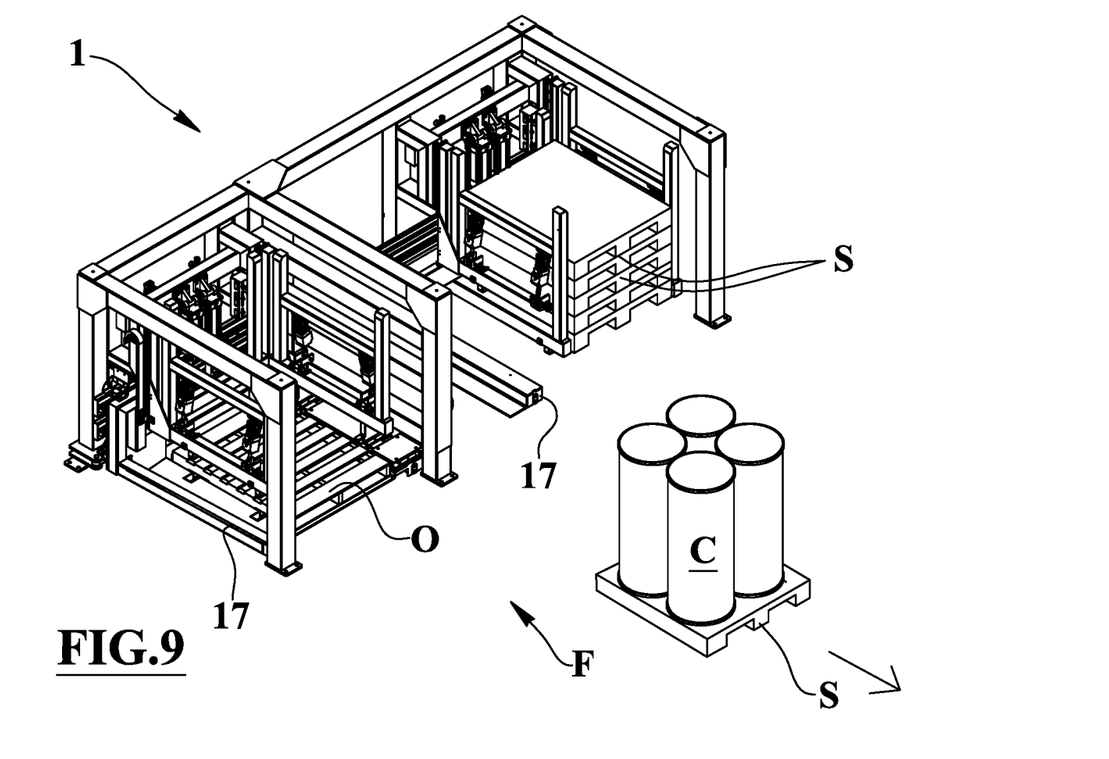
Figure 10:
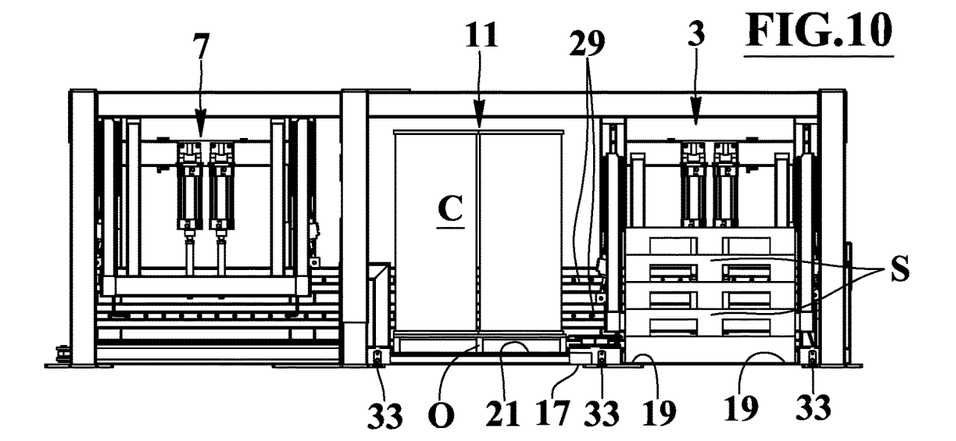
FIGS. 10-17 illustrate front and schematic views of the device of FIG. 1, associated with a load supported by a pallet that has to be replaced and a set of replacement pallets, in a possible operational sequence.
Figure 11:
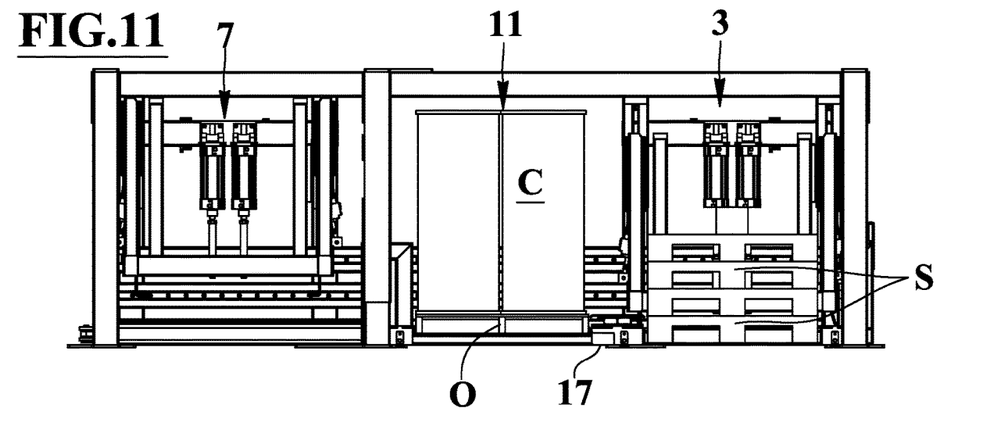
Figure 12:
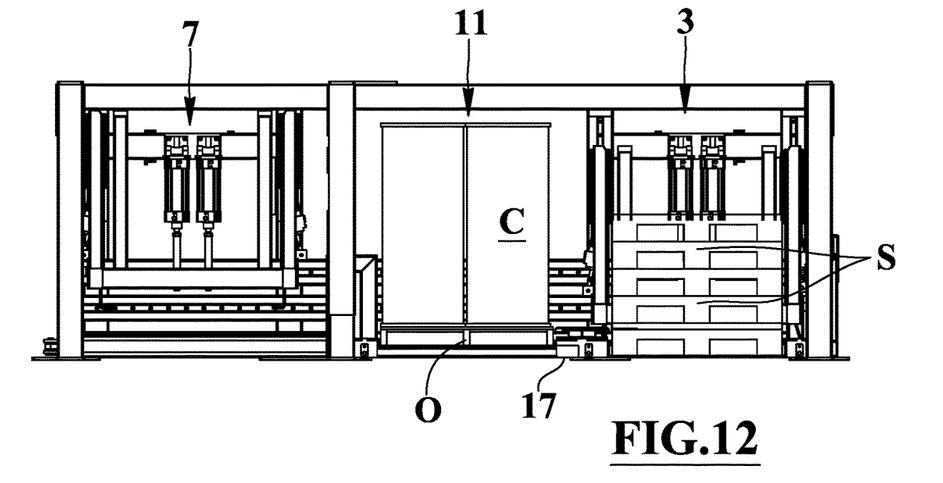
Figure 13:
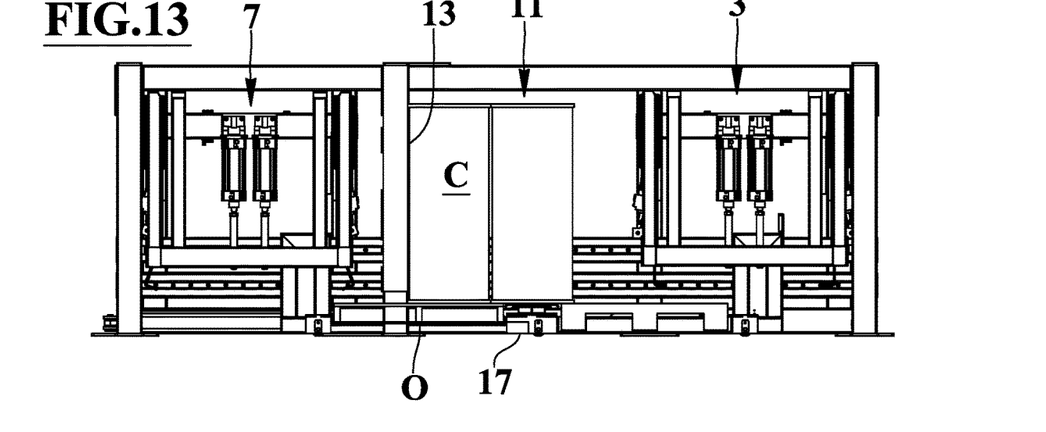
Figure 14:
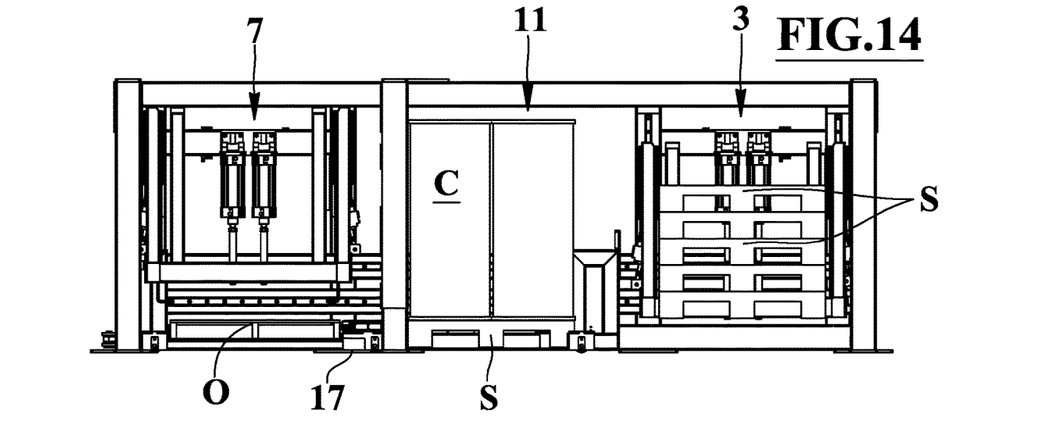
Figure 15:
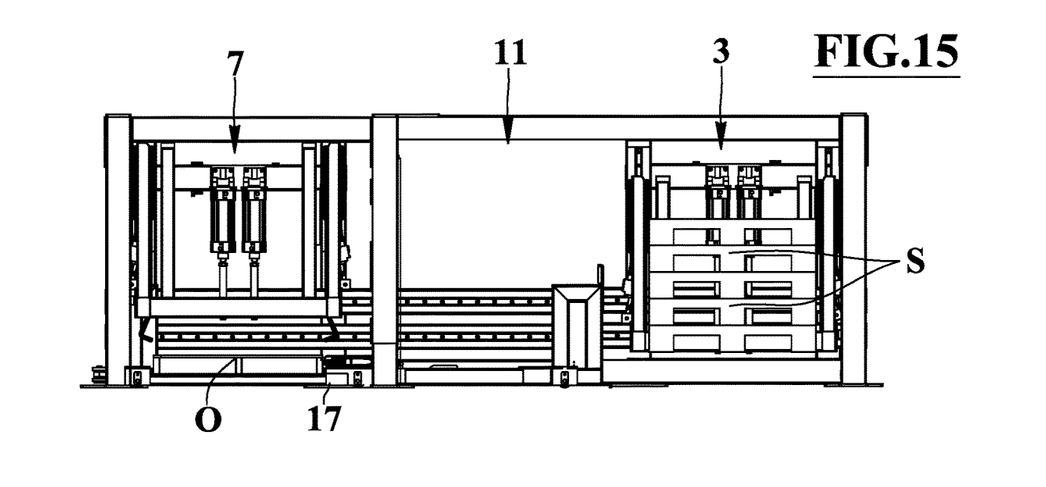
Figure 16:
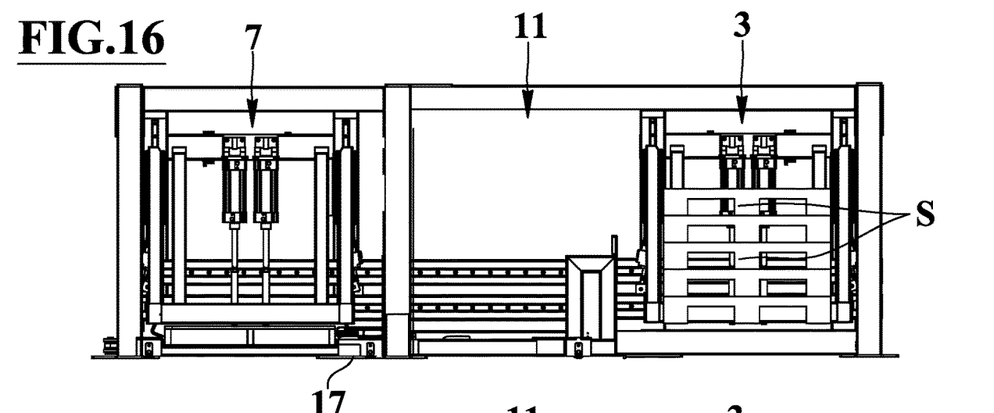
Figure 17:
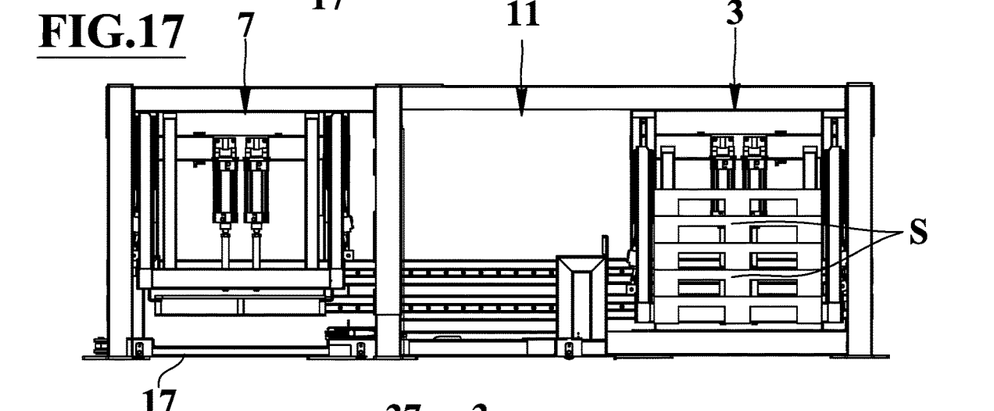
Figure 18:
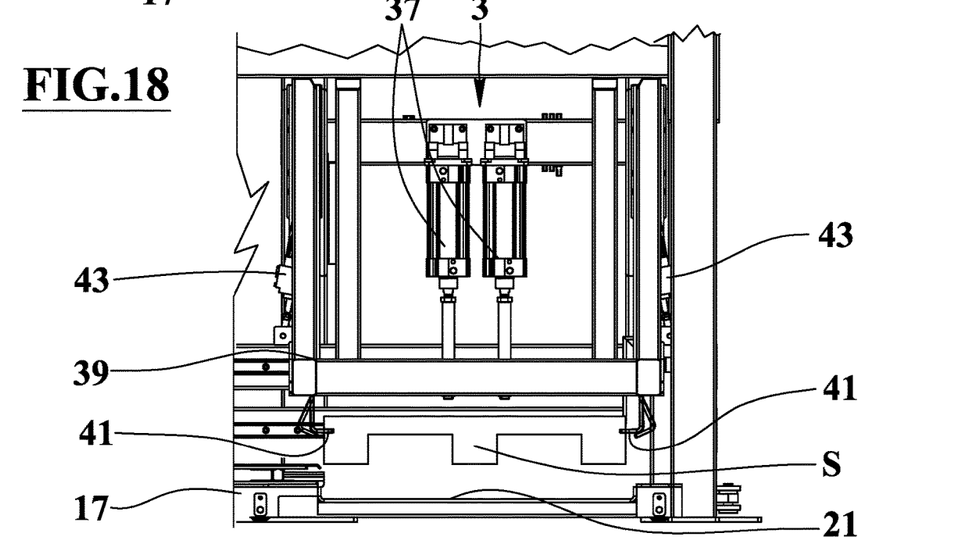
FIG. 18 schematically illustrates an enlarged detail of the device in which a pair of hooks is shown, in continuous and dashed lines, in conditions of engagement and disengagement respectively of a replacement pallet.

Prior to the start of the operation of the device 1, the translating element 17 is placed in the first extreme condition I and a pallet truck or a forklift inserts a stack of replacement pallets S into the first store element 3 and a load C supported by an original pallet O is introduced and deposited, by a pallet truck or a forklift, into the entrance element 11.

In this way, the first seating 19 and the second seating 21 respectively house a replacement pallet S released by the first store element 3 and the original pallet O of the load C housed in the entrance element 11.

The translation of the translating element 17 moves the original pallet O through the window element 15 while the stopping wall 13 blocks the load C and at the same time such translation moves the replacement pallet S under the load C.

The translating element 17 carries a set of slide planes 25 placed between the first seating 19 and seating 21 and assigned to slide under the load C, keeping it stable during the translation of the translating element 17 between the first I and second F extreme conditions. The sliding surfaces are made of low-friction material or are treated or coated on the surface to facilitate sliding under the load.

Preferably at least the edges of the slide planes 25 which are in front during the transition from the first extreme condition I to the second extreme condition F are bent or bevelled downwards to avoid jamming with the lower face of the load.

The device 1 includes at least one guide 29 parallel to the direction of translation of the translating element 17 which is provided with a set of carriages 31 movable along this at least one guide 29. Preferably such guides and carriages are of the ball circulation type or of the type of rails and carriages provided with castors or wheels. Preferably the translating element 17 is cantilevered to at least one guide 29 and to avoid excessive stress and facilitate translation, the portion of the translating element 17 opposite the set of carriages 31 carries a plurality of idle rolling means 33 freely rolled on a surface, slab support, platform or floor to support the device 1.

The device 1 includes one or more actuator means, of the motorized rack and pinion type, linear actuator, chain or belt driven by a motor or the like, to operate the translation of the translating element 17. It is also provided, for example in case of particularly light loads and low weight pallets, that the translating element 17 is operated manually and that the device can be free of the latter actuator means.

The support surface for the original pallet O of the second seating 21 is placed at a height, fixed or adjustable, such as to keep the upper faces of the replacement pallets S and original pallets O at the same height. Furthermore, the device 1 can include at least a first inclined plane 95 with an adjustable angle by means of a respective inclination actuator and of reduced or negligible thickness placed in front of the entrance element 11 to facilitate the insertion in the latter 11 of the original pallet O with the load C and the removal from such entrance element 11 of the replacement pallet S with the load C using a pallet truck or similar devices, for example with forks superimposed on the wheels.

The device 1 can include, in addition to this first inclined plane 95, also a second inclined plane 97 with a fixed angle placed in front of the second store element 7 and assigned to facilitate the removal of the stack of original pallets O using a pallet truck or similar devices. The adoption of the first and second inclined planes is optional as the use of lifts (of the type with forks cantilevered with respect to the wheels, also called forklifts) for loading and picking up the original and replacement pallets with the load from the entrance 11 and of the stacks of replacement pallets from the second store element 7 do not require such inclined planes.

Each of the first 3 and second 7 store elements includes a lifting element 37 operated vertically by respective vertical lifting actuators 39 and provided with a plurality of hooking means 41 activated by respective hooking actuators 43 and arranged to hook and unhook the sides of the replacement pallets S or original pallets O perpendicular to the direction of translation of the translating element 17.

Alternatively, each first 3 and second 7 store element can be connected to a respective respectively replacement and original conveyor or pallet feeders so that the first store element 3 positions a replacement pallet, supplied from time to time by the respective conveyor or feeder, to the first seating 19 and the second store element simply picks up an original pallet from the second seating 21 and transfers it to the respective conveyor or feeder. Such alternative allows continuous operation without the need to provide stacks of replacement pallets and evacuate stacks of original pallets.

The invention also requires that the device be provided with a frame or support body, for example made with interconnected beams and uprights, fixed to the floor or surface, platform or slab and to which at least the guide or guides 29, the stopping wall 13 and the fixed parts of the first 3 and second 7 store elements and of the entrance element 11 are fixed.

The device 1 can be controlled manually, for example by means of commands of an electrical panel and/or pneumatic or hydraulic valves, or it can be controlled in a semi-automatic or automatic manner. In particular, the device 1 can be provided with a computer or other programmable control means provided only with output ports for the control of active elements of the device 1 or, in addition to the output ports, also with input ports for data provided by sensors and/or detectors.

Figure 19:
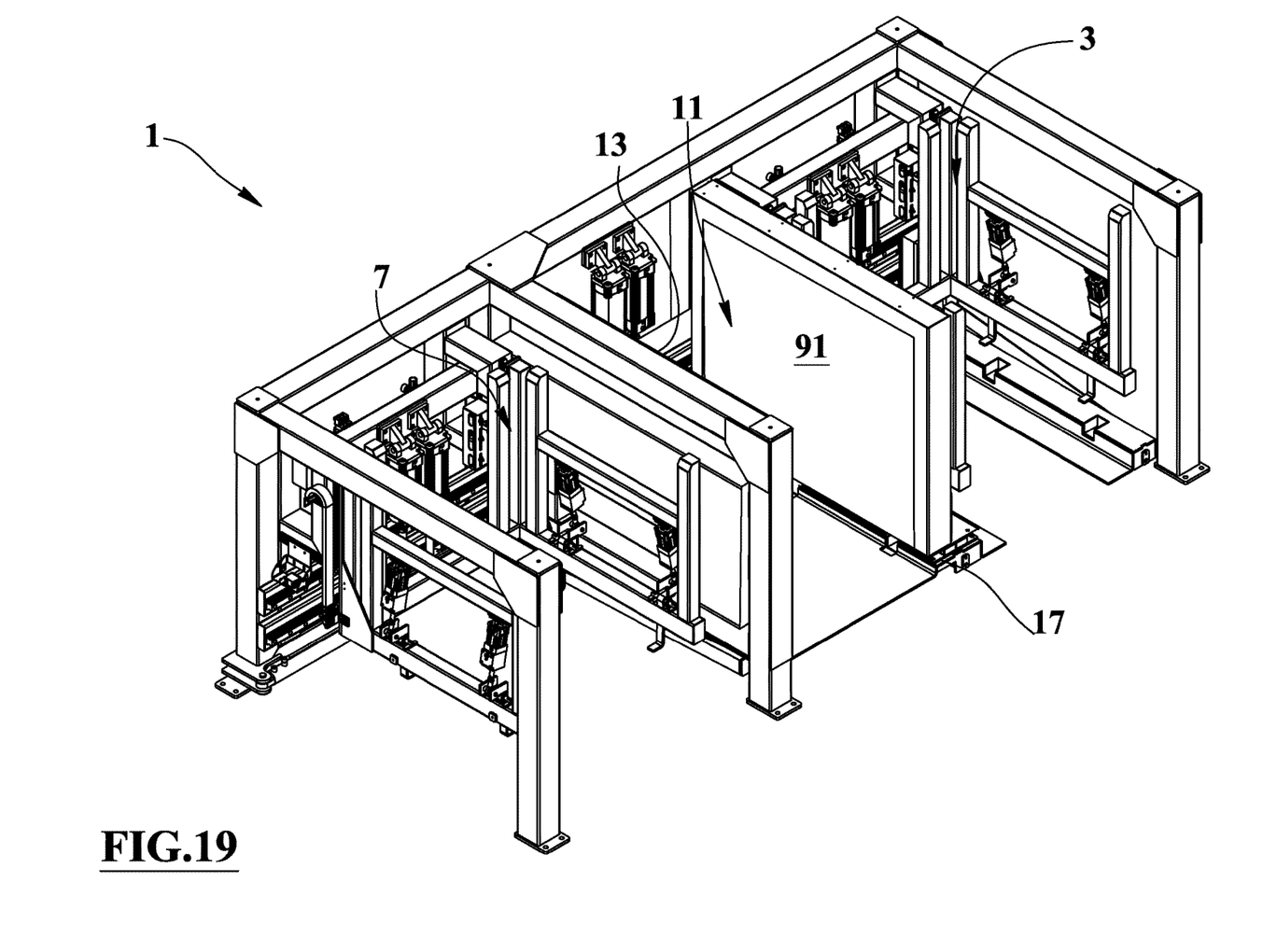
FIG. 19 and FIG. 20 illustrate respectively axonometric and front views of a variant of the device of FIG. 1.
Figure 20:
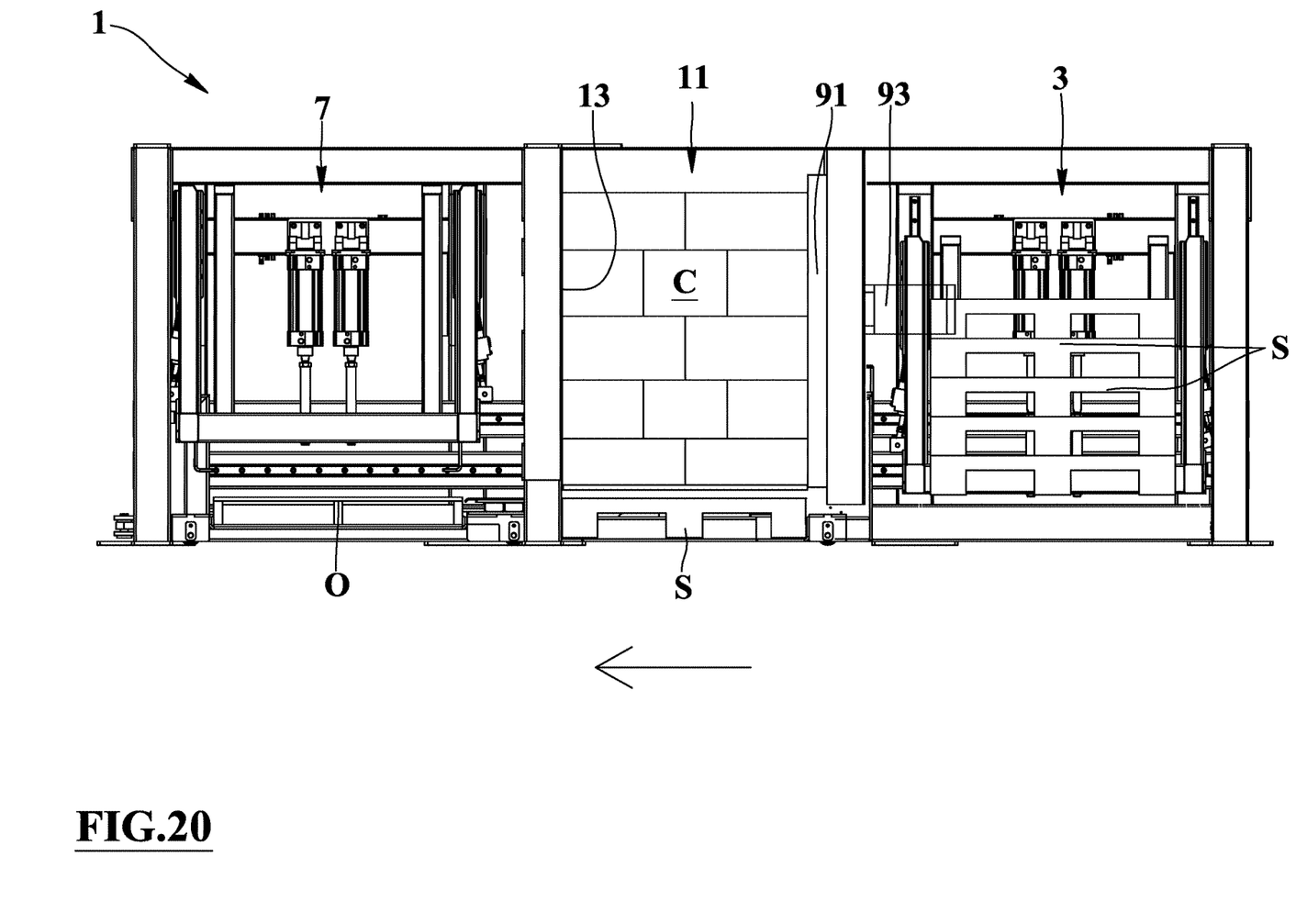

The variant of the device 1 of FIG. 19 and FIG. 20 differs from the previous embodiment of FIGS. 1-18 in that it includes a pushing plate element 91 facing, parallel and spaced from the stopping wall 13 and operated towards and away from the stopping wall 13 by a respective pushing actuator 93 to clamp the load, blocking it at the height at which it enters the entrance element 11, at least during the translation of the translating element 17 between the first I and second F extreme conditions and release the load C on top of the replacement pallet S in the second extreme condition F.

A further variant of the device 1 of the invention, the understanding of which does not require specific figures, includes, in addition to the pushing plate means 91 and the respective pushing actuator 93 of FIG. 19 and FIG. 20, also a lifting element provided with actuators or motors and supporting the pushing plate means 91 with the respective pushing actuator 93 and the stopping wall 13 to lift the load C clamped between the pushing plate means 91 and the stopping wall 13 at least during the translation of the translating element 17 between the first I and second F extreme conditions.

The device can be provided with connections for connecting the output ports of said computer or other programmable control means to at least one between:

actuator means for actuating the translation of the translating element 17;

pushing actuator 93 of the pushing plate 91, if present;
actuators or motors of the lifting element which translates the pushing plate means 91, the respective pushing actuator 93 and the stopping wall 13, if present;
vertical lifting actuators 39 of the lifting element 37;
hooking actuators 43 of the hooking means 41;
inclination actuator of the first inclined plane 95, if present;
active parts and components in general.

The device can be provided with any connections connecting the input ports of the computer or other programmable control means to sensors, status detectors and the like assigned to detect states and/or positions of at least one between:
- translating element 17 and/or respective actuator means;
- hooking means 41 and/or respective hooking actuators 43 and lifting element 37 and/or the respective vertical lifting actuators 39 of the first 3 and second 7 store elements;
- first inclined plane 95 and/or respective inclination actuator if present;
- pushing plate means 91 and/or respective pushing actuator 93 if present;
- lifting element of the pushing plate means 91, of the pushing actuator 93 and of the stopping wall 13 and/or actuators or motors of such lifting element, if present;
- parts and components subject to movement or change of state in general.

The computer or other programmable control means is programmed for coordinated operation of the elements and parts of the device 1.

The invention claimed is:

1. A device (1) for replacing a pallet carrying a load (C) with a replacement pallet, said device comprising:
   a first store element (3) for receiving a replacement pallet(S) or a stack of replacement pallets at a base (5) of the first store element;
   a second store element (7) for receiving at a base (9) of the second store element one original pallet (O) at a time and for allowing evacuation of each respective received original pallet (O) or for allowing formation of a stack of received original pallets;
   an entrance element (11) interposed between the first store element (3) and the second store element (5) for receiving said one original pallet (O) with said load (C) and separated from the second store element (7) by a stopping wall (13) assigned to abut with the load (C) and having at its base a window element (15) for passage of the original pallet (O) from the entrance element (11) to the second store element (7);
   a translating element (17) provided with a first seating (19) and a second seating (21) assigned to respectively receive a replacement pallet(S) and an original pallet (O) where such translating element (17) is moved between a first extreme condition (I) in which the first seating (19) is placed in correspondence with the base (5) of the first store element (3) and the second seating (21) is placed in correspondence with a lower portion (6) or base of the entrance element (11) and a second extreme condition (F) in which the first seating (19) is placed in correspondence with said lower portion or base (6) of the entrance element (11) and the second seating (21) is placed in correspondence with the base (9) and the second store element (7); wherein starting from an initial condition in which the translating element (17) is in the first extreme condition (I) and the first seating (19) and second seating (21) respectively house a replacement pallet(S) for release from the first store element (3) and an original pallet (O) of a load (C) housed in the entrance element (11), a translation of the translating element (17) moves the original pallet (O) through the window element (15) while the stopping wall (13) blocks the load (C) and simultaneously moves the replacement pallet(S) under the load, wherein the translating element (17) carries a set of slide planes (25) placed between the first seating (19) and second seating (21) for sliding under the load (C) while keeping the load stable during the translation of the translating element (17) between the first extreme condition (I) and second extreme condition (F).

2. A device (1) for replacing a pallet carrying a load (C) with a replacement pallet, said device comprising:
   a first store element (3) for receiving a replacement pallet(S) or a stack of replacement pallets at a base (5) of the first store element;
   a second store element (7) for receiving at a base (9) of the second store element one original pallet (O) at a time and for allowing evacuation of each respective received original pallet (O) or for allowing formation of a stack of received original pallets;
   an entrance element (11) interposed between the first store element (3) and the second store element (5) for receiving said one original pallet (O) with said load (C) and separated from the second store element (7) by a stopping wall (13) assigned to abut with the load (C) and having at its base a window element (15) for passage of the original pallet (O) from the entrance element (11) to the second store element (7);
   a translating element (17) provided with a first seating (19) and a second seating (21) assigned to respectively receive a replacement pallet(S) and an original pallet (O) where such translating element (17) is moved between a first extreme condition (I) in which the first seating (19) is placed in correspondence with the base (5) of the first store element (3) and the second seating (21) is placed in correspondence with a lower portion (6) or base of the entrance element (11) and a second extreme condition (F) in which the first seating (19) is placed in correspondence with said lower portion or base (6) of the entrance element (11) and the second seating (21) is placed in correspondence with the base (9) and the second store element (7); wherein starting from an initial condition in which the translating element (17) is in the first extreme condition (I) and the first seating (19) and second seating (21) respectively house a replacement pallet(S) for release from the first store element (3) and an original pallet (O) of a load (C) housed in the entrance element (11), a translation of the translating element (17) moves the original pallet (O) through the window element (15) while the stopping wall (13) blocks the load (C) and simultaneously moves the replacement pallet(S) under the load, wherein a portion of the translating element (17) opposite the set of carriages (31) carries a plurality of idle rolling means (33) freely rollable on a plane, plate support or support floor of the device (1).

3. A device (1) for replacing a pallet carrying a load (C) with a replacement pallet, said device comprising:
   a first store element (3) for receiving a replacement pallet(S) or a stack of replacement pallets at a base (5) of the first store element;
   a second store element (7) for receiving at a base (9) of the second store element one original pallet (O) at a time and for allowing evacuation of each respective received original pallet (O) or for allowing formation of a stack of received original pallets;

an entrance element (11) interposed between the first store element (3) and the second store element (5) for receiving said one original pallet (O) with said load (C) and separated from the second store element (7) by a stopping wall (13) assigned to abut with the load (C) and having at its base a window element (15) for passage of the original pallet (O) from the entrance element (11) to the second store element (7);

a translating element (17) provided with a first seating (19) and a second seating (21) assigned to respectively receive a replacement pallet(S) and an original pallet (O) where such translating element (17) is moved between a first extreme condition (I) in which the first seating (19) is placed in correspondence with the base (5) of the first store element (3) and the second seating (21) is placed in correspondence with a lower portion (6) or base of the entrance element (11) and a second extreme condition (F) in which the first seating (19) is placed in correspondence with said lower portion or base (6) of the entrance element (11) and the second seating (21) is placed in correspondence with the base (9) and the second store element (7); wherein starting from an initial condition in which the translating element (17) is in the first extreme condition (I) and the first seating (19) and second seating (21) respectively house a replacement pallet(S) for release from the first store element (3) and an original pallet (O) of a load (C) housed in the entrance element (11), a translation of the translating element (17) moves the original pallet (O) through the window element (15) while the stopping wall (13) blocks the load (C) and simultaneously moves the replacement pallet(S) under the load, comprising a lifting element provided with actuators or motors and supporting the pushing plate means (91) with the respective pushing actuator (93) and the stopping wall (13) for lifting the load (C) clamped between the pushing plate means (91) and the stopping wall (13) at least during the translation of the translating element (17) between the first extreme condition (I) and the second extreme condition (F).

4. A device (1) for replacing a pallet carrying a load (C) with a replacement pallet, said device comprising:

a first store element (3) for receiving a replacement pallet(S) or a stack of replacement pallets at a base (5) of the first store element;

a second store element (7) for receiving at a base (9) of the second store element one original pallet (O) at a time and for allowing evacuation of each respective received original pallet (O) or for allowing formation of a stack of received original pallets;

an entrance element (11) interposed between the first store element (3) and the second store element (5) for receiving said one original pallet (O) with said load (C) and separated from the second store element (7) by a stopping wall (13) assigned to abut with the load (C) and having at its base a window element (15) for passage of the original pallet (O) from the entrance element (11) to the second store element (7);

a translating element (17) provided with a first seating (19) and a second seating (21) assigned to respectively receive a replacement pallet(S) and an original pallet (O) where such translating element (17) is moved between a first extreme condition (I) in which the first seating (19) is placed in correspondence with the base (5) of the first store element (3) and the second seating (21) is placed in correspondence with a lower portion (6) or base of the entrance element (11) and a second extreme condition (F) in which the first seating (19) is placed in correspondence with said lower portion or base (6) of the entrance element (11) and the second seating (21) is placed in correspondence with the base (9) and the second store element (7); wherein starting from an initial condition in which the translating element (17) is in the first extreme condition (I) and the first seating (19) and second seating (21) respectively house a replacement pallet(S) for release from the first store element (3) and an original pallet (O) of a load (C) housed in the entrance element (11), a translation of the translating element (17) moves the original pallet (O) through the window element (15) while the stopping wall (13) blocks the load (C) and simultaneously moves the replacement pallet(S) under the load, wherein a support plane for the original pallet (O) of the second seating (21) is placed at a fixed or adjustable height such as to keep an upper face of the replacement pallet(S) and an upper face of the original (O) pallet at a same height and wherein the device comprises at least a first inclined plane (95) with an adjustable angle by means of a respective actuator of inclination and of reduced or marginal thickness placed in front of the entrance element (11) to facilitate the insertion of the original pallet (O) into the entrance element (11) with the load (C) and to facilitate removal of the replacement pallet(S) from the entrance element (11) with the load (C).

5. A device (1) for replacing a pallet carrying a load (C) with a replacement pallet, said device comprising:

a first store element (3) for receiving a replacement pallet(S) or a stack of replacement pallets at a base (5) of the first store element;

a second store element (7) for receiving at a base (9) of the second store element one original pallet (O) at a time and for allowing evacuation of each respective received original pallet (O) or for allowing formation of a stack of received original pallets;

an entrance element (11) interposed between the first store element (3) and the second store element (5) for receiving said one original pallet (O) with said load (C) and separated from the second store element (7) by a stopping wall (13) assigned to abut with the load (C) and having at its base a window element (15) for passage of the original pallet (O) from the entrance element (11) to the second store element (7);

a translating element (17) provided with a first seating (19) and a second seating (21) assigned to respectively receive a replacement pallet(S) and an original pallet (O) where such translating element (17) is moved between a first extreme condition (I) in which the first seating (19) is placed in correspondence with the base (5) of the first store element (3) and the second seating (21) is placed in correspondence with a lower portion (6) or base of the entrance element (11) and a second extreme condition (F) in which the first seating (19) is placed in correspondence with said lower portion or base (6) of the entrance element (11) and the second seating (21) is placed in correspondence with the base (9) and the second store element (7); wherein starting from an initial condition in which the translating element (17) is in the first extreme condition (I) and the first seating (19) and second seating (21) respectively house a replacement pallet(S) for release from the first store element (3) and an original pallet (O) of a load (C)

housed in the entrance element (11), a translation of the translating element (17) moves the original pallet (O) through the window element (15) while the stopping wall (13) blocks the load (C) and simultaneously moves the replacement pallet(S) under the load, wherein each of the first store element (3) and the second store element (5) comprises a lifting element (37) vertically actuated by respective vertical lifting actuators (39) and provided with a plurality of hooking means (41) actuated by respective hooking actuators (43) and arranged to hook and unhook sides of the replacement pallet(S) or the original (O) pallet perpendicular to the direction of translation of the translating element (17).

6. The device of claim 4, further comprising a second inclined plane (97) with a fixed angle placed in front of the second store element (7) for facilitating removal of the stack of original pallets (O).

* * * * *